(12) United States Patent
Cartwright

(10) Patent No.: US 7,862,723 B2
(45) Date of Patent: Jan. 4, 2011

(54) REVERSE OSMOSIS SYSTEM

(75) Inventor: Thomas Cartwright, St. Michael, MN (US)

(73) Assignee: The Good Water Company, Inc., St. Michael, MN (US)

( * ) Notice: Subject to any disclaimer, the term of this patent is extended or adjusted under 35 U.S.C. 154(b) by 0 days.

(21) Appl. No.: 12/470,337

(22) Filed: May 21, 2009

(65) Prior Publication Data

US 2010/0116742 A1    May 13, 2010

Related U.S. Application Data

(63) Continuation-in-part of application No. 12/267,184, filed on Nov. 7, 2008.

(51) Int. Cl.
*B01D 61/00* (2006.01)
*B01D 63/00* (2006.01)

(52) U.S. Cl. .......... 210/652; 210/257.2; 210/195.2; 210/110; 210/136; 210/117

(58) Field of Classification Search .......... 210/257.2, 210/652, 110, 117, 136, 195.2
See application file for complete search history.

(56) References Cited

U.S. PATENT DOCUMENTS

| | | | |
|---|---|---|---|
| 4,350,587 A | 9/1982 | Jarrell | |
| 4,650,586 A | 3/1987 | Ellis, III | |
| 4,761,295 A | 8/1988 | Casey | |
| 4,770,770 A | 9/1988 | Regunathan et al. | |
| 4,853,117 A * | 8/1989 | Burrows | 210/110 |
| 4,906,372 A | 3/1990 | Hopkins | |
| 5,093,012 A | 3/1992 | Bundy et al. | |
| 5,358,635 A | 10/1994 | Frank et al. | |
| 5,451,314 A | 9/1995 | Neuenschwander | |
| 5,928,503 A | 7/1999 | Shang-Chun | |
| 6,001,244 A | 12/1999 | Salter et al. | |
| 6,068,764 A | 5/2000 | Chau | |
| 6,099,735 A | 8/2000 | Kelada | |
| 6,190,558 B1 * | 2/2001 | Robbins | 210/652 |
| 6,228,255 B1 | 5/2001 | Peterson et al. | |
| 6,258,265 B1 | 7/2001 | Jones | |

(Continued)

FOREIGN PATENT DOCUMENTS

JP    410052688 A    2/1998

(Continued)

OTHER PUBLICATIONS

Non-Final Office Action dated Dec. 8, 2008 for U.S. Appl. No. 11/383/701, 8 pages.

(Continued)

*Primary Examiner*—Ana M Fortuna
(74) *Attorney, Agent, or Firm*—Duane Morris LLP

(57) ABSTRACT

An apparatus for purifying water according to one embodiment of the present invention may include a feed line fluidically connected to a reverse osmosis module containing a semipermeable membrane. The semipermeable membrane produces purified water and a concentrate. A drain line is also connected to the reverse osmosis module configured to transport concentrate. A product line is connected to the reverse osmosis module for transporting purified water. Operatively associated with the product line and drain line is a shut-off mechanism containing a pressure sensor or gasket operatively associated with an appliance configured to activate the shut-off mechanism.

28 Claims, 14 Drawing Sheets

U.S. PATENT DOCUMENTS

| | | |
|---|---|---|
| 6,334,951 B1 | 1/2002 | Cheng |
| 6,702,942 B1 | 3/2004 | Nield |
| 7,264,731 B2 | 9/2007 | Bosko |
| 7,402,240 B2 * | 7/2008 | Kung et al. .................. 210/110 |
| 7,513,996 B2 * | 4/2009 | Kloos et al. .............. 210/257.2 |
| 7,550,084 B2 * | 6/2009 | Schmitt ................... 210/257.2 |
| 7,597,807 B2 * | 10/2009 | Sieth et al. ............... 210/321.6 |
| 7,598,807 B2 | 10/2009 | Takagi |
| 2002/0170858 A1 | 11/2002 | Maddux et al. |
| 2003/0034305 A1 | 2/2003 | Luehmann et al. |
| 2004/0245175 A1 * | 12/2004 | Godec et al. ................ 210/639 |
| 2005/0150843 A1 | 7/2005 | Berthold |
| 2005/0183999 A1 | 8/2005 | Hackett et al. |

FOREIGN PATENT DOCUMENTS

| | | | |
|---|---|---|---|
| JP | 02004167404 A | | 6/2004 |
| WO | WO2004/014528 | * | 2/2004 |

OTHER PUBLICATIONS

Non-Final Office Action dated Nov. 4, 2009 for U.S. Appl. No. 12/267,184.

* cited by examiner

REVERSE OSMOSIS SYSTEM

CROSS-REFERENCE TO RELATED APPLICATIONS

This is a continuation in part of co-pending U.S. nonprovisional application Ser. No. 12/267,184, filed Nov. 7, 2008, which is incorporated by reference for all that it discloses.

FIELD OF THE INVENTION

The present invention relates to reverse osmosis systems in general and, specifically, to direct feed reverse osmosis systems for appliances.

BACKGROUND OF THE INVENTION

Various types of reverse osmosis ("RO") systems are used to purify water, generally by removing dissolved impurities and particles larger than about 1.0 angstrom (0.0001 micron). While on one hand, osmosis processes cause a solution with low concentration to diffuse through a semipermeable membrane to a solution with higher concentration until equilibrium is reached, on the other hand, RO processes apply pressure causing a highly-concentrated solution to flow through a semipermeable membrane to a less concentrated solution until the pressure is no longer applied. To cause flow across the semipermeable membrane, however, the applied pressure must be used to overcome osmosis.

In addition to semipermeable membranes, a typical RO system may include prefilters. Sediment prefilters have been used to extend the life of the RO semipermeable membrane by removing suspended sediment to reduce fouling, while carbon filters assist RO membranes in removing chlorine, chloramines, and volatile organic compounds from water. Multiple prefilters, such as Kinetic Degradation Fluxion ("KDF") filters with carbon filters, may also be used to remove heavy metals and reduce chlorine/chloramine accumulation.

Existing RO systems are not without their problems, however. For example, storage tanks of the typical system create undesirable back pressure, which must be alleviated by a booster pump. Storage tanks and booster pumps require extra maintenance and extra space that is often at a premium for most RO systems. Moreover, storage tanks and booster pumps decrease efficiency by significantly increasing total input into the system while maintaining constant output. While RO systems attempt to provide purified water efficiently, none have achieved success.

BRIEF SUMMARY OF THE INVENTION

Apparatus for purifying water according to the present invention includes a reverse osmosis cartridge with a semipermeable membrane for providing purified water and a concentrate; a reverse osmosis module for housing the reverse osmosis cartridge, the reverse osmosis module including a feed line, a drain line, and a product line; a prefilter connected to the feed line; a hydraulic shut-off mechanism operatively coupled to the drain line and the product line, and containing a slide valve and at least one gasket; and, an appliance connected to the product line and operatively associated with the gasket.

In another embodiment, the apparatus for purifying water includes a hydraulic shut-off mechanism operatively associated with the appliance. The hydraulic shut-off mechanism includes a slide valve and at least one gasket. The gasket and slide valve are operatively associated with the appliance and maintain production of purified water without a booster pump, storage tank, or electrical components.

A method for purifying water according to the present invention includes: activating an appliance thereby initiating a pressure drop across a reverse osmosis system without using any electrical components; and supplying purified water to the appliance without a pump or storage tank in sufficient amounts to allow the appliance to operate substantially without interruption.

BRIEF DESCRIPTION OF THE DRAWINGS

Illustrative and exemplary embodiments of the invention are shown in the drawings in which:

FIG. 14 shows a cross-section view of the hydraulic shut-off mechanism when the appliance is turned on.

DETAILED DESCRIPTION OF THE INVENTION

The present invention comprises RO system 10 and method 100 for purifying water, which can produce about 0.9 to about 15.1 liters/minute (about 0.25 to about 4.0 gallons/minute) of purified water 40.

Figure 1:
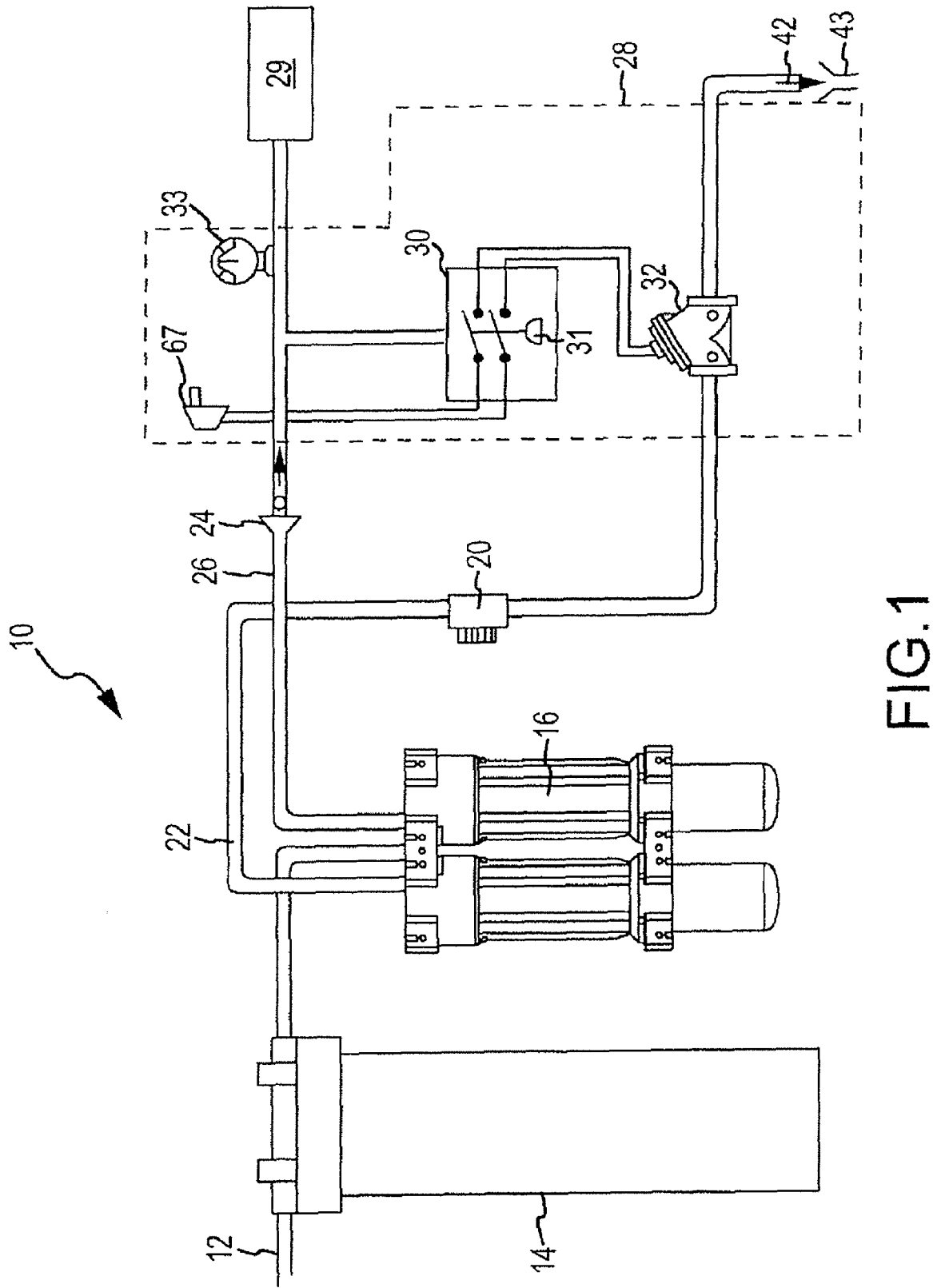
FIG. 1 shows a schematic representation of a reverse osmosis system directly connected to an appliance according to one embodiment of the invention.

RO system 10 will now be described in greater detail with reference to the embodiment illustrated in FIG. 1. RO system 10 includes prefilter 14, RO module 16, RO cartridge 18, RO semipermeable membrane 48, and shut-off mechanism 28. RO system 10 may increase production by having cartridge 18 directly connected to appliance 29 and shut-off mechanism 28. RO system 10 comprises a feed line 12, an inlet end of which is connected to a water supply (not shown) which may be a well, municipal water supply, or other water supply as may be familiar to one of ordinary skill in the art after becoming familiar with the teachings of the present invention. An outlet end of feed line 12 is also connected to prefilter 14 that screens out heavy transition metals, chlorine, chloramines, and sediments. Filtering out larger contaminants using prefilter 14 may extend the life of RO cartridge 18 (FIG. 6) within RO module 16. RO system 10 also comprises flow controller 20, check valve 24, and pressure gauge 33. Flow controller 20 is connected to drain line 22 and check valve 24 is connected to product line 26. An optional check valve 24 can additionally be added to drain line 22. Pressure gauge 33 is connected to product line 26 and may be used to calibrate RO system 10.

Connected to both drain line 22 and product line 26 is shut-off mechanism 28. In one embodiment as shown in FIG. 1, shut-off mechanism 28 comprises a pressure switch 30 and solenoid valve 32. Pressure switch 30 is connected to pressure sensor 31 and is operatively associated with shut-off mechanism 28. Pressure sensor 31 is also configured to activate shut-off mechanism 28. Additionally, pressure sensor 31 may be operatively associated with appliance 29 such as ice machines, coffee and tea machines, other beverage dispensers, evaporative coolers, and aquariums, i.e. point of use appliances. Turning on appliance 29 may cause a pressure drop across RO system 10, thereby activating shut-off mechanism 28 through operation of pressure sensor 31 and pressure switch 30 as is explained in more detail below. By using shut-off mechanism 28 with RO semipermeable membrane 48, RO system 10 maintains an outlet pressure similar to its inlet pressure. Having similar outlet and inlet pressures under certain conditions allows RO system 10 to work effectively, without booster pumps, for most appliances 29.

Figure 2:
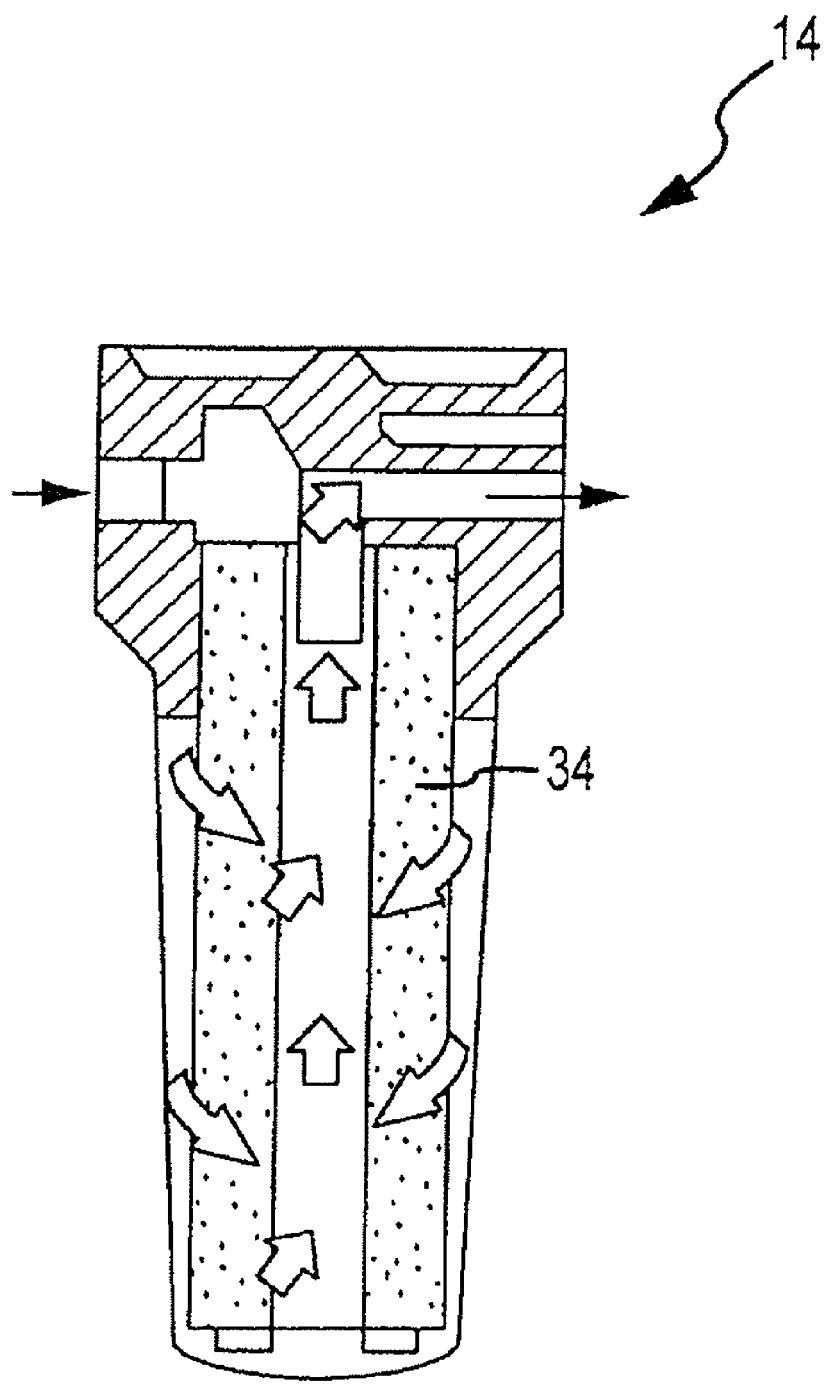
FIG. 2 shows a cross-section view of a carbon filter.
Figure 3:
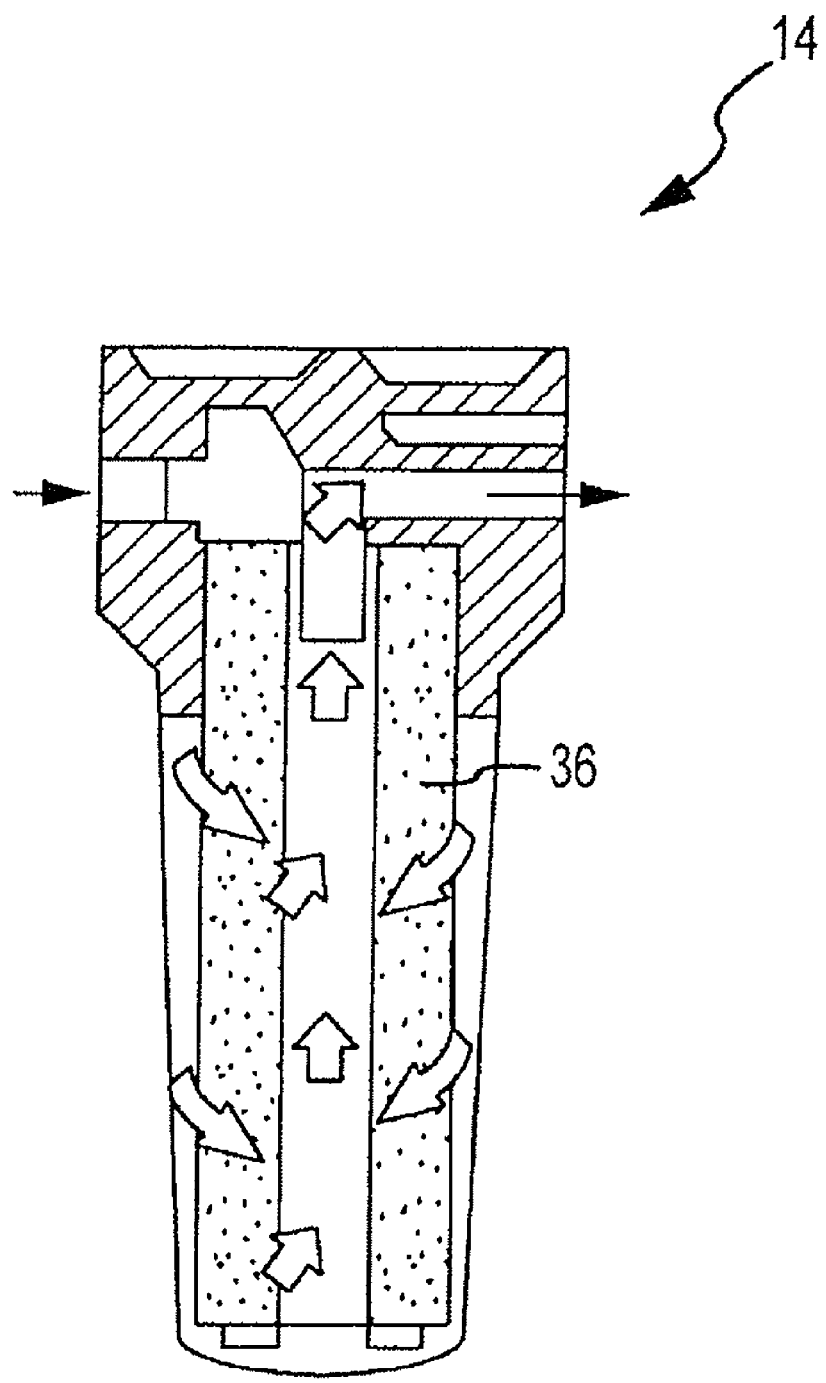
FIG. 3 shows a cross-section view of a KDF filter.
Figure 6:
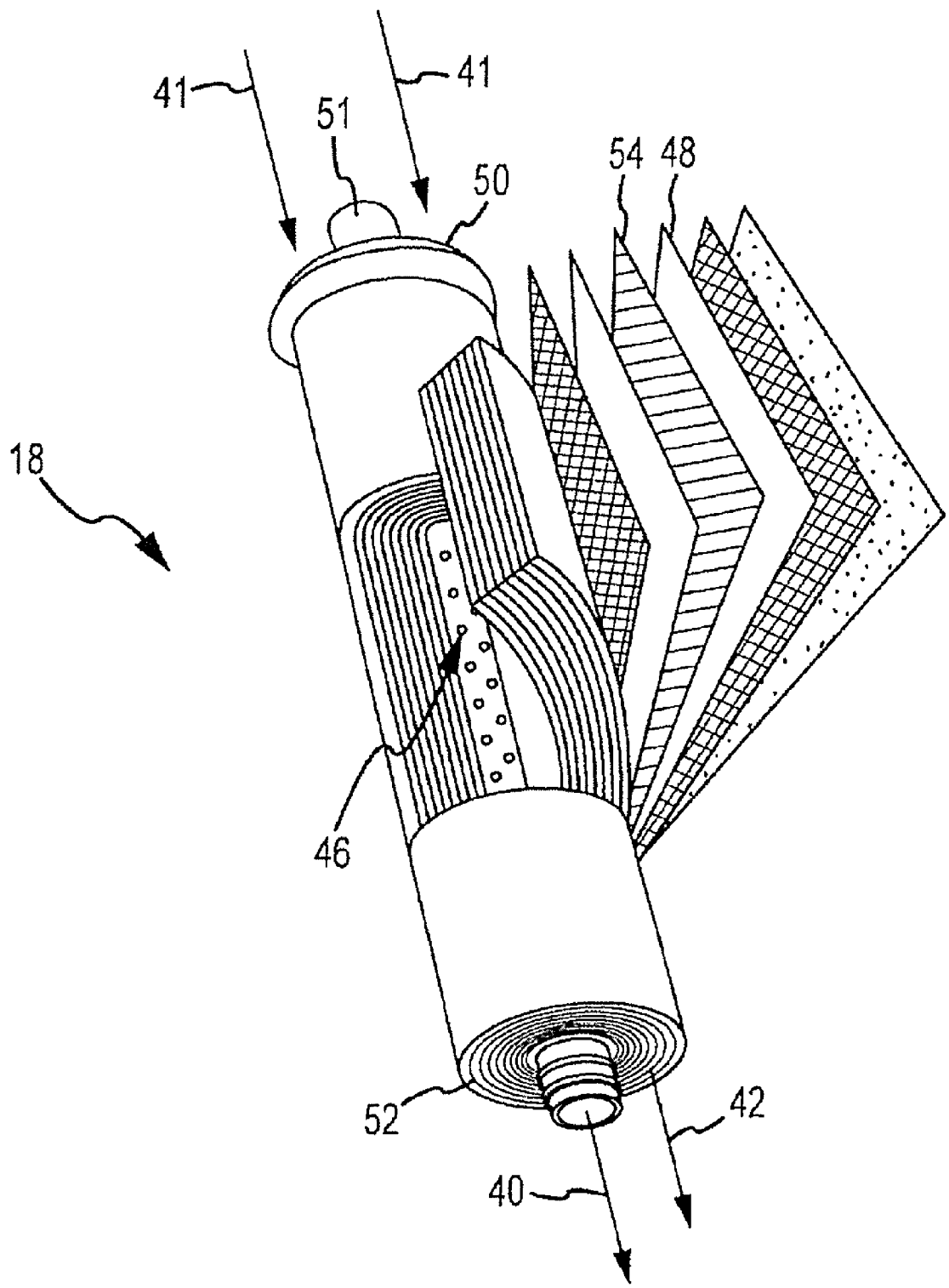
FIG. 6 shows a cross-section view of a RO semipermeable membrane.

Referring to FIGS. 2 and 3, prefilter 14 will now be described in greater detail. Prefilter 14 may comprise a carbon filter 34 or KDF filter 36, although other prefilters may be used. Carbon filter 34 may comprise activated carbon; KDF filter 36 may comprise carbon zinc alloy. Carbon filter 34 can additionally incorporate KDF filter 36 or may be used in series with KDF filter 36 or in any other fashion familiar to one having ordinary skill in the art. Prefilter 14 assists RO semipermeable membrane 48 by removing contaminants in unpurified water 41, such as larger particles, chlorine, chloramines, sediment, heavy metals, and volatile organic compounds, before unpurified water 41 enters RO module 16 and therefore may extend the life of RO semipermeable membrane 48 (FIG. 6). Without prefilter 14, semipermeable membrane 48 may be more susceptible to fouling and oxidizers, such as transition metals, chlorine, and chloramines, that may cause RO semipermeable membrane 48 to deteriorate. Other combinations of prefilter 14 may be used to target particular contaminants; polypropylene filters, for example, may be used to remove extra fine sand, dirt, silt, or rust. Variations of prefilter 14 may be used as would become apparent to persons having ordinary skill in the art after having become familiar with teachings provided herein. Consequently, the present invention should not be regarded as limited to a particular type of prefilter 14.

Figure 4:
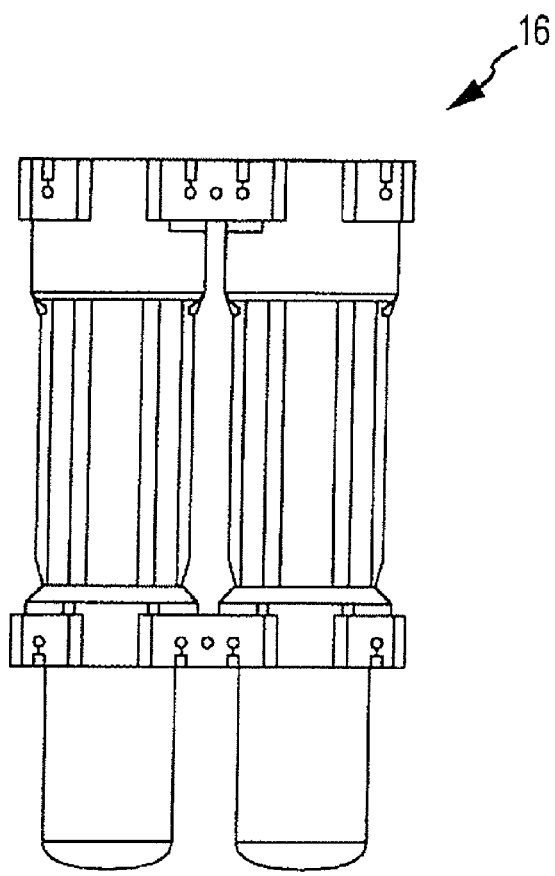
FIG. 4 shows a side view of a RO module.
Figure 5:
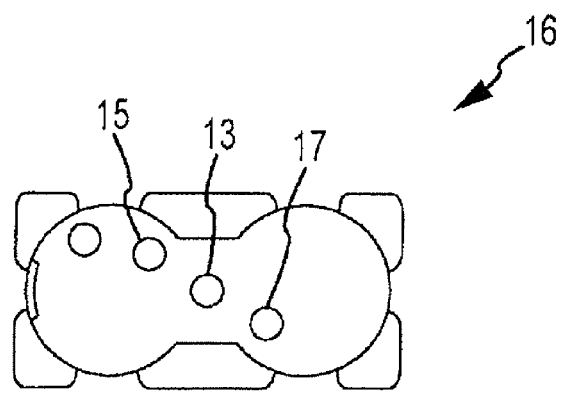
FIG. 5 shows a top view of a RO module.

Referring to FIGS. 4 and 5, in one embodiment, RO module 16 comprises feed line inlet 13, drain line outlet 15, and product line outlet 17. Feed line inlet 13, drain line outlet 15, and product line outlet 17 are configured to allow for production of purified water 40 and concentrate 42 by RO semipermeable membrane 48 (FIG. 6). Feed line inlet 13 directs unpurified water 41 to RO semipermeable membrane 48 (in the direction of arrows shown). Cap 51 prevents unpurified water 41 from entering central perforated tube 46 before contacting semipermeable membrane 48, as shown in FIG. 6. Concentrate 42 exits RO module 16 through drain line outlet 15 into drain 43 as purified water 40 simultaneously exits RO module 16 through product line outlet 17. Concentrate 42 comprises water containing contaminates. RO module 16, in one embodiment, is constructed of Noryl,® a blend of polyphenylene oxide and polystyrene commercially available on the internet and developed by General Electric®.

As shown in FIG. 6, RO semipermeable membrane 48 is layered between spacers 54 and spiral wound around central perforated tube 46. Unpurified water 41 from feed line inlet 13 enters first portion 50 of RO cartridge 18 and permeates through RO semipermeable membrane 48 and spacers 54 to central perforated tube 46, which is capped by cap 51 at first portion 50 to prevent unpurified water 41 from entering central perforated tube 46.

Figure 7:
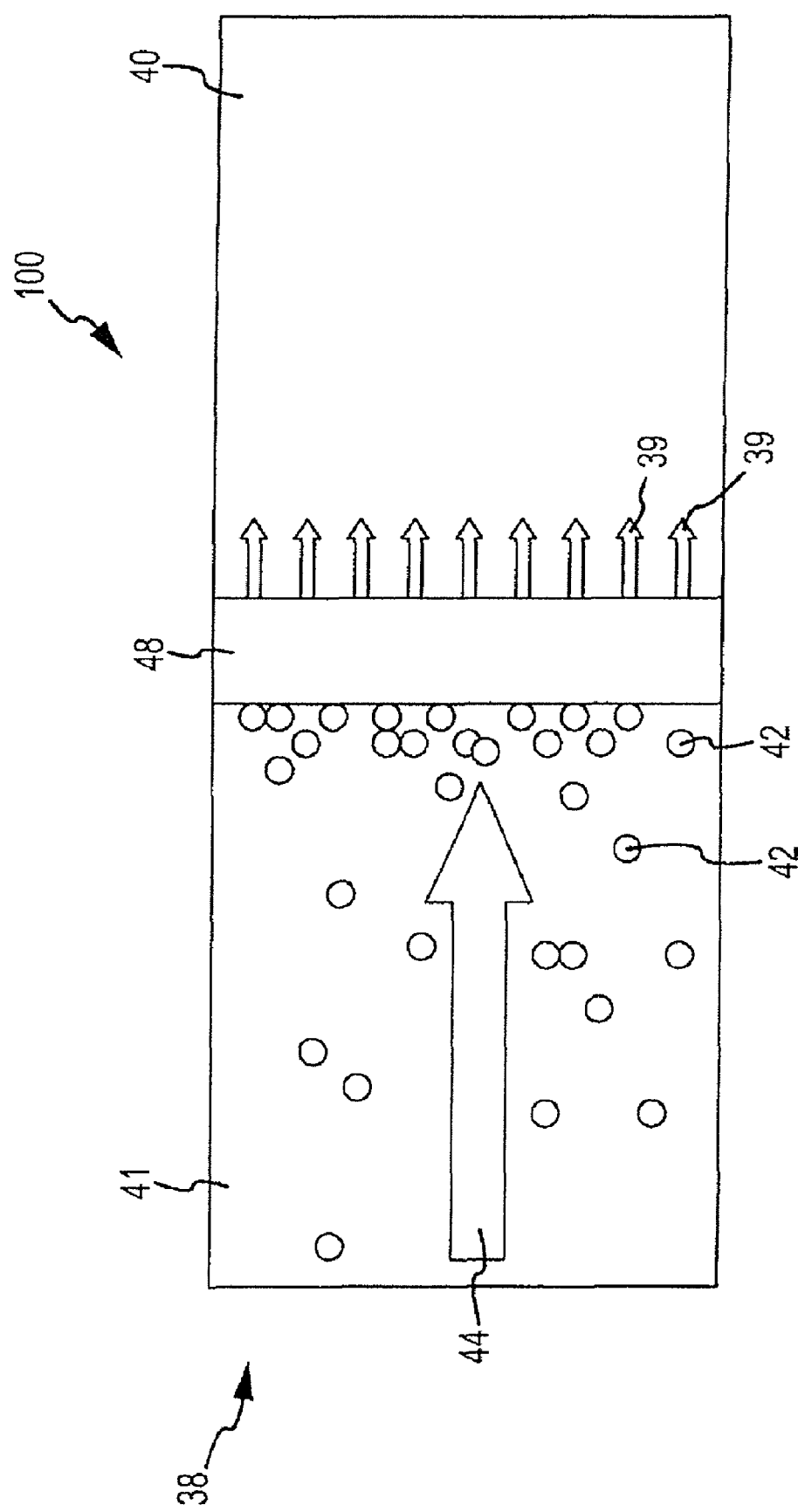
FIG. 7 shows a side view of a RO process.

As will be explained in greater detail below, method 100 may comprise RO process 38 in which pressure 44 overcomes osmosis and causes unpurified water 41 to permeate through RO semipermeable membrane 48. As illustrated in FIG. 7, flow through RO semipermeable membrane 48 (as shown by arrow 39) produces concentrate 42 and purified water 40.

Returning to FIG. 6, once unpurified water 41 enters central perforated tube 46, it becomes purified water 40 because it has been filtered by semipermeable membrane 48. Purified water 40 exits second portion 52 of RO cartridge 18 through central perforated tube 46. One advantage of winding semipermeable membrane 48 around perforated tube 46 is an increase in membrane area per unit volume, thereby improving flow rate and efficiency in removing contaminants. Spacers 54 may promote turbulent flow that decreases membrane fouling by keeping unpurified water 41 velocities, pressures, and other flow quantities constantly and randomly fluctuating. Contaminants within water are, thus, unable to settle and foul semipermeable membrane 48.

In embodiments shown and described herein, RO cartridge 18 is the Merlin® Reverse Osmosis Membrane Element, which is commercially available through the internet. Various types of RO cartridges 18, nevertheless, can be used as would become apparent to persons having ordinary skill in the art after having become familiar with teachings provided herein. Consequently, the present invention should not be limited to a particular type of RO cartridge 18.

Together, semipermeable membrane 48 and prefilter 14 remove from unpurified water 41 a plurality of contaminants, such as various salts, oxidation chemicals, and organics, as shown in Table 1.

TABLE 1

| Contaminants Removed by the RO System 10 CONTAMINANTS | | | |
|---|---|---|---|
| Radium 226 | Sodium | Bacteria | Chromium III |
| Radium 228 | Copper | Herbicides/Pesticides | Chromium VI |
| Crypto virus | Arsenic V | Sulfur | Fluoride |
| Giardia virus | Nitrates/Nitrites | Hydrogen sulfide | Cadmium |
| Calcium++ | Barium | Ammonia | Mercury |
| Magnesium++ | Lead | Chlorine/Chloramines | Iron++ |

Figure 8:
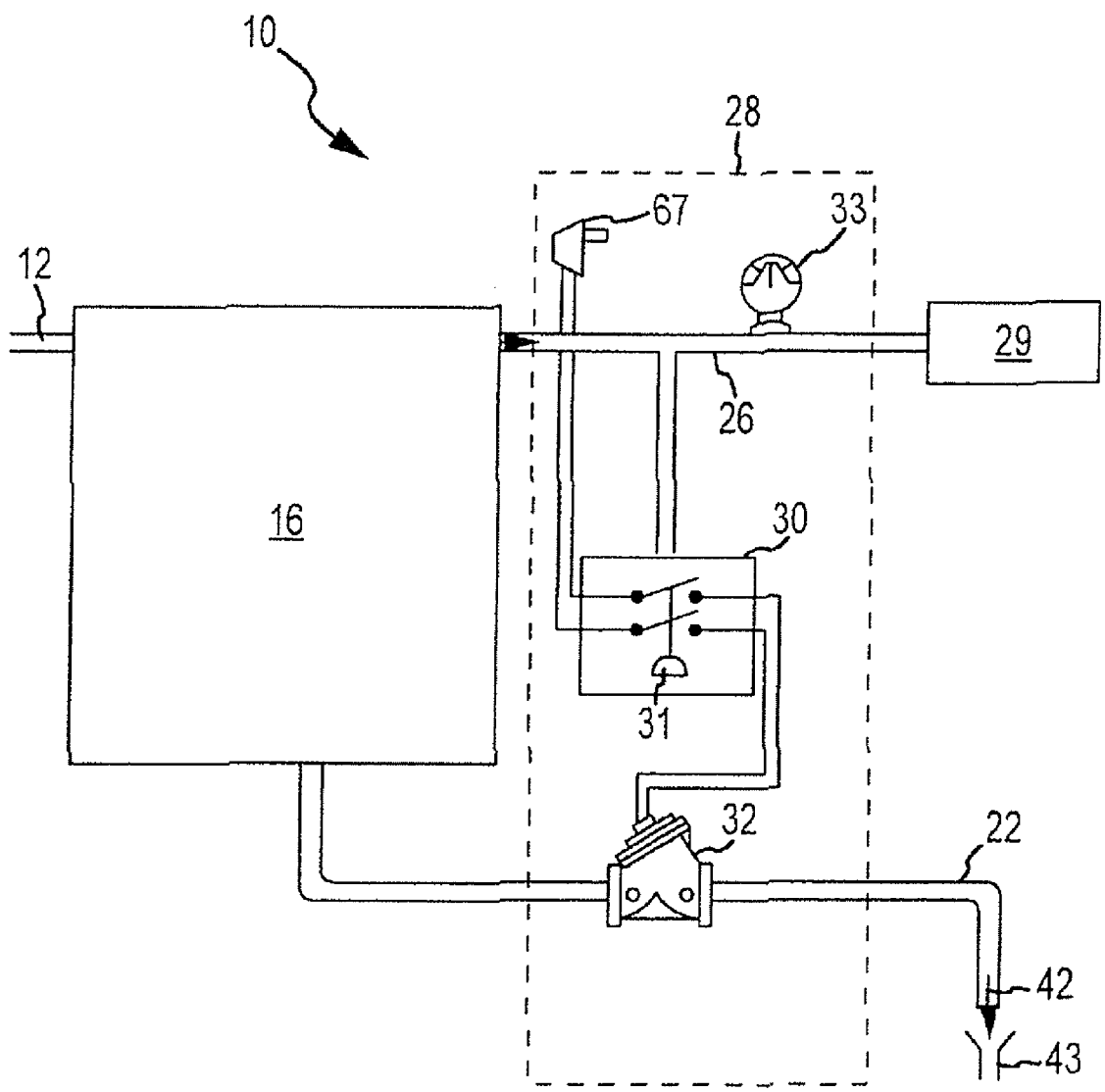
FIG. 8 is a schematic representation of the shut-off mechanism.

The initiation of the flow of unpurified water 41 into RO system 10 is caused by activating shut-off mechanism 28. With reference to FIG. 8, shut-off mechanism 28 is connected to both drain line 22 and product line 26. As pressure changes across RO system 10 occur, shut-off mechanism 28 automatically stops or starts production of purified water 40. When pressure drops, shut-off mechanism 28 automatically starts production of purified water 40 by initiating flow of unpurified water 41 into RO system 10 through feed line 12. In an embodiment shown in FIG. 1, the pressure drop may be initiated by turning on appliance 29. In another embodiment, the pressure drop may be initiated by opening a spigot (not shown) connected to an outlet end of product line 26.

Use of shut-off mechanism 28 in conjunction with semipermeable membrane 48 may create more efficient production of purified water 40, maintaining flow rates between about 0.9 to about 15.1 liters/minute (about 0.25 to about 4.0 gallons/minute) without use of storage tank or booster pump.

Additionally, an efficiency ratio of purified water 40 to unpurified water 41 may be obtained between about 33% and about 60%. Unlike typical shut-off mechanisms connected to storage tanks, shut-off mechanism 28 also may be used with inlet pressures ranging between about 207 kPa and about 690 kPa (about 30 psi and about 100 psi), without a booster pump, depending on the temperature and presence of total dissolved solids (TDS) in unpurified water 41.

Shut-off mechanism 28 will now be described with reference to one embodiment of RO system 10 in which appliance 29 comprises an ice machine with a capacity between about 22.7 to about 45.4 kg (about 50 to about 100 lbs). In that embodiment, shut-off mechanism 28 may be used without a booster pump given inlet pressure in a range of about 345 kPa and about 690 kPa (about 50 psi to about 100 psi), water temperature in a range of about 10° and about 38° C. (about 50° and about 100° F.), and inlet TDS of between about 200 and about 2,000 parts per million (ppm). The higher the ppm of TDS, the higher the temperature and the pressure necessary to maintain adequate flow through RO system 10 as shown in Table 2:

TABLE 2

Inlet TDS/Inlet Temperature/Inlet Pressure

|  |  | Inlet Temperature | | | | | | |
|---|---|---|---|---|---|---|---|---|
|  |  | 35 | 40 | 50 | 60 | 70 | 80 | 90 | 100 |
|  | 2000 | | | | | | | | |
|  | 1800 | | | | | | | | |
|  | 1600 | | | | | | | | |
|  | 1400 | | | | | | | | |
|  | 1200 | | | | | | | | |
| Inlet TDS | 1000 | | | | | | | | |
|  | 800 | | | | | | | | |
|  | 600 | | | | | | | | |
|  | 400 | | | | | | | | |
|  | 200 | | | | | | | | |
|  | 0 | | | | | | | | |
|  |  | 30 | 40 | 50 | 60 | 70 | 80 | 90 | 100 |
|  |  | Inlet Pressure | | | | | | |

: Booster Pump Required;
: Booster Pump Recommended;
: No Booster Pump Required

Additionally, without storage tanks, RO system 10 is much smaller than conventional systems.

Figure 9:
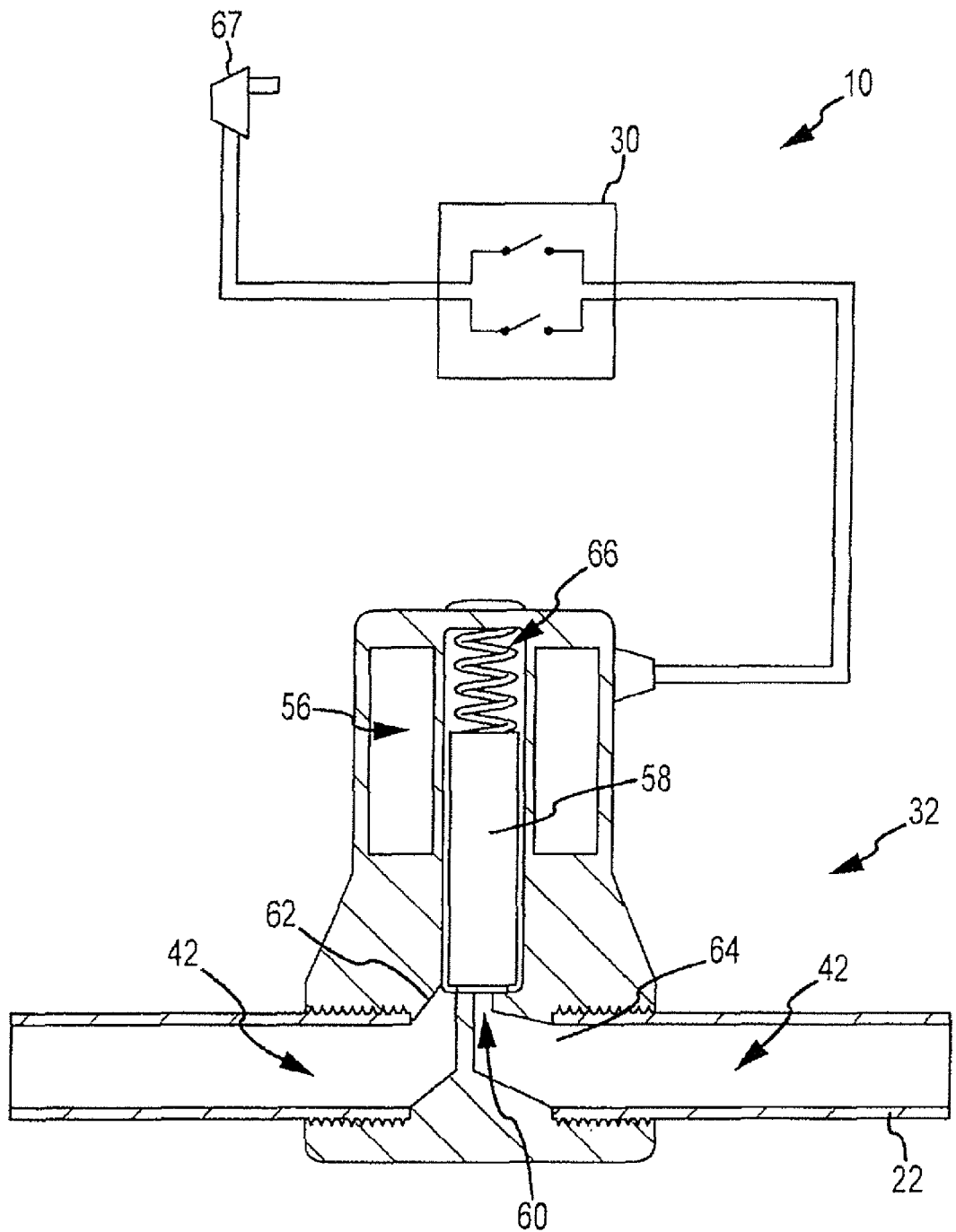
FIG. 9 shows a cross-section view of a solenoid.

Shut-off mechanism 28 further includes solenoid valve 32 illustrated in FIG. 9. In one embodiment, solenoid value 32 may comprise an electromechanical device activated by pressure switch 30. Upon activation, current is sent to coil 56 creating a magnetic field. The field draws plunger 58 away from solenoid orifice 60 to overcome solenoid spring 66. As plunger 58 moves away from solenoid orifice 60, concentrate 42 flows through solenoid inlet 62 into solenoid outlet 64. When solenoid valve 32 is not activated plunger 58 is positioned within solenoid orifice 60, thus restricting flow of concentrate 42. Solenoid valve 32 may be used with adaptor 67 for both direct current ("DC") and alternating current ("AC"). In FIG. 8, solenoid valve 32 is connected to 24 Volt-AC adaptor 67. Solenoid valve 32 can additionally be made to work with almost any applied voltage. Although, common voltage use with solenoids ranges from 6 Volt-DC to 24 Volt-DC and 24 Volt-AC to 240 Volt-AC. In one embodiment, the solenoid valve 32 is part #075-DC manufactured by Rain Bird.

Figure 10:
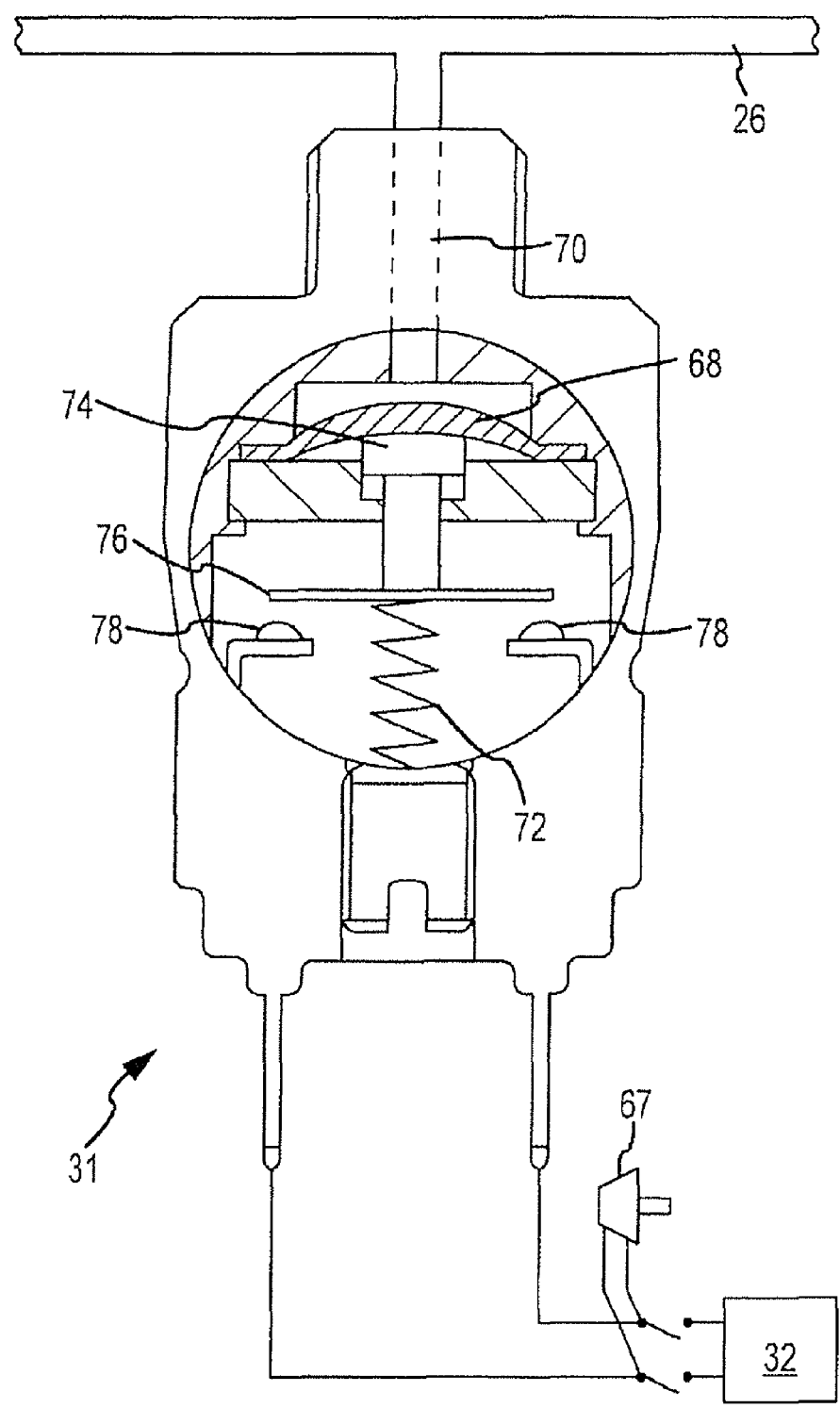
FIG. 10 shows a cross-section view of a pressure switch.

Now referring primarily to FIG. 10, pressure sensor 31 and pressure switch 30 will now be described. In one embodiment, pressure sensor 31 is operatively associated with pressure switch 30. As shown, Pressure sensor 31 comprises a diaphragm 68, pressure sensor orifice 70, preloaded compression spring 72, pressure sensor piston 74, contact disk 76, and pressure sensor contacts 78. When pressure increases within product line 26 and pressure sensor orifice 70 during production of purified water 40, a force is applied to diaphragm 68. In one embodiment, in which RO system 10 is connected directly to appliance 29, pressure may be increased by deactivating, or turning off, appliance 29. If the applied force is greater than opposing force exerted by preloaded compression spring 72, then pressure sensor piston 74 moves contact disk 76. Once contact disk 76 touches pressure sensor contacts 78, a circuit is closed, causing current to pass through pressure sensor 31, thereby activating pressure switch 30 and solenoid valve 32, stopping production of purified water 40. Pressure sensor 31 operates in the opposite manner when pressure drops across RO system 10, such as would occur when appliance 29 is turned on.

Pressure sensor 31 may be advantageous in terms of system efficiency. In the embodiments shown, pressure sensor 31 activates pressure switch 30 to start or stop production of purified water 40. Pressure sensor 31 therefore is able to quickly react to system requirements by automatically triggering solenoid valve 32 and thus reduce waste.

In one embodiment, efficiency of RO system 10 may be further increased by directly connecting the outlet end of product line 26 to appliance 29. Activating appliance 29 automatically creates the pressure drop across RO system 10. When pressure sensor 31 senses the pressure drop across RO system 10, pressure switch 30 is automatically activated, which in turn activates solenoid valve 32 to start production of purified water 40. Turning the appliance 29 off has the opposite affect, increasing the pressure across the RO system 10 and stopping the production of purified water 40 through the operation of pressure sensor 31, pressure switch 30 and solenoid valve 32. An advantage of directly connecting appliance 29 to RO module 16 via product line 26 is eliminating the interference and lag time attributable to a storage tank connected to a booster pump.

The present invention comprises method 100 for purifying water. In one embodiment, method 100 may comprise producing purified water 40 and concentrate 42 through RO process 38.

Figure 11:
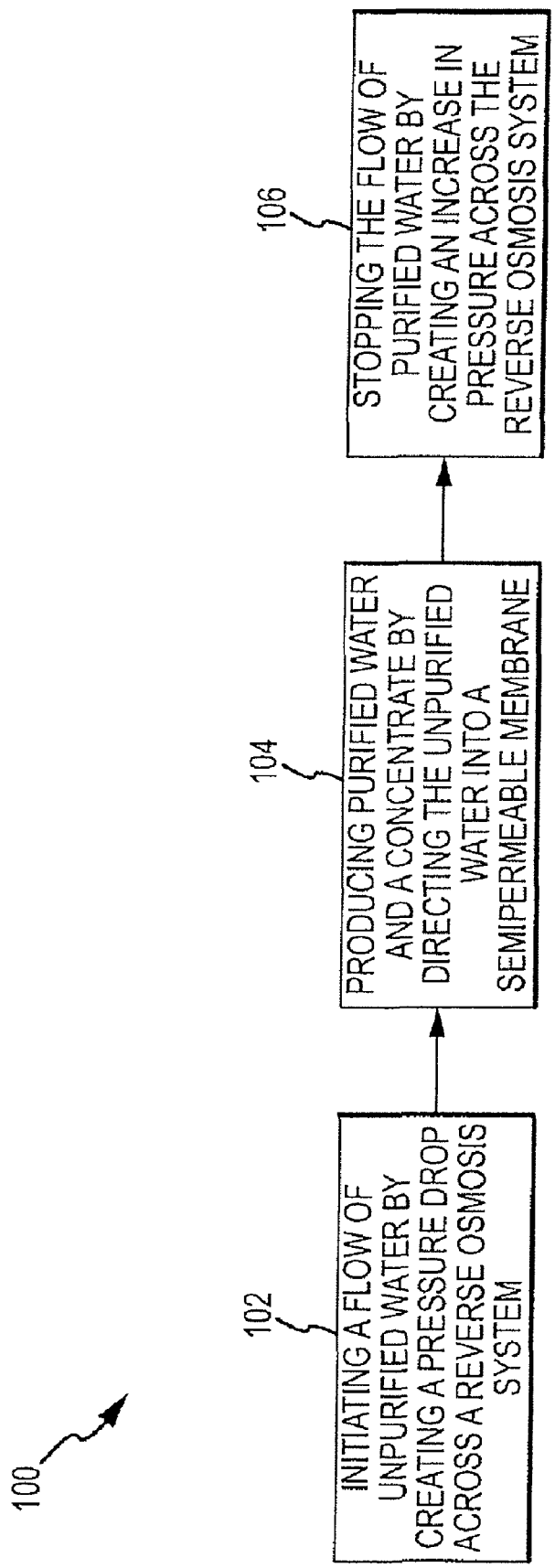
FIG. 11 illustrates a method for purifying water according to one embodiment of the invention.
Figure 12:
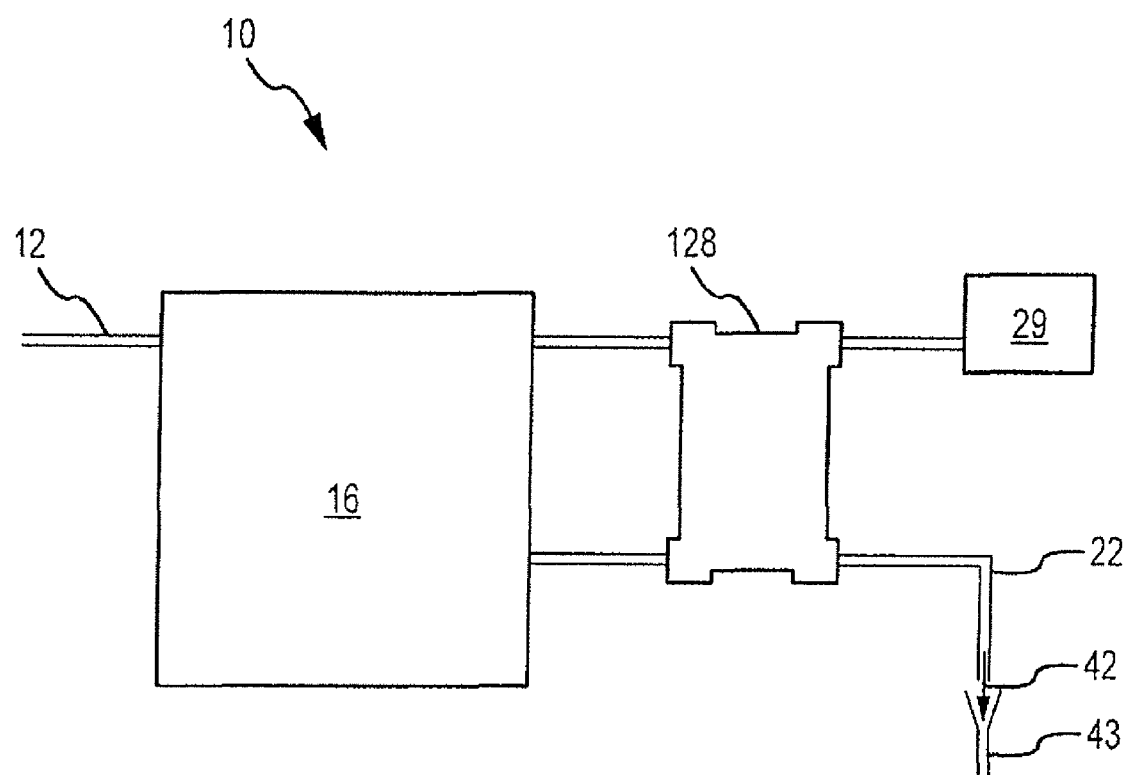
FIG. 12 is a schematic representation of the hydraulic shut-off mechanism.

In another embodiment illustrated in FIG. 11, method 100 for purifying water comprises initiating flow of unpurified water 41 by creating a pressure drop across a reverse osmosis system 10 (step 102). This may be accomplished by activating the solenoid valve 32 thereby opening drain line 22. In addition, the flow of purified water may be supplied in a range of about 207 kPa to about 690 kPa (about 30 psi to about 100 psi), as previously described. Method 100 also includes producing purified water 40 and concentrate 42 by directing unpurified water 41 into RO semipermeable membrane 48 (step 104), as well as stopping flow of purified water 40 by creating an increase in pressure across reverse osmosis system 10 (step 106). Method 100 may further comprise draining concentrate 42.

In an embodiment in which the RO module 16 is connected to appliance 29 via product line 26, method 100 may comprise creating the pressure drop and initiating the flow of unpurified water 41 by activating appliance 29. Method 100 may further comprise providing purified water 40 directly to appliance 29 without having to store purified water 40 or without having to pump purified water 40, or both. Method 100 may also comprise draining the concentrate 42. Further, turning off, or deactivating, appliance 29, causes pressure to increase across RO system 10, thereby stopping the flow of unpurified water 41 into feed line 12, thereby stopping production of purified water 40, as well as concentrate 42.

RO system 10 and method 100 may efficiently produce about 0.9 to about 15.1 liters/minute (about 0.25 to about 4.0 gallons/minute) of purified water 40. While other systems and methods require use of storage tanks and booster pumps, RO system 10 and method 100 maintain high production rates at low inlet pressures without storage tanks and booster pumps. Directly connecting (i.e., without storage tank(s)) semipermeable membrane 48 to appliance 29 and operatively associating shut-off mechanism 28 with drain line 22 and product line 26 may significantly reduce waste, while maintaining efficiency ratios of purified water 40 to unpurified water 41 between about 33% and about 60%. Also, by directly connecting semipermeable membrane 48 to appliance 29, RO system 10 may be used with inlet pressures ranging between about 207 kPa and about 690 kPa (about 30 psi and about 100 psi), without a booster pump.

In another embodiment of RO system 10, shut-off mechanism 28 comprises hydraulic shut-off mechanism 128. As shown in FIGS. 12 through 15, hydraulic shut-off mechanism 128 is connected to both the product line 26 and drain line 22. In one embodiment, hydraulic shut-off mechanism 128 contains no electrical components and comprises a slide valve 134 operatively associated with at least one gasket 130. Slide valve 134 is positioned within slide valve cavity 136 and is adjacent to gasket 130 which is operatively associated with appliance 29.

Figure 13:
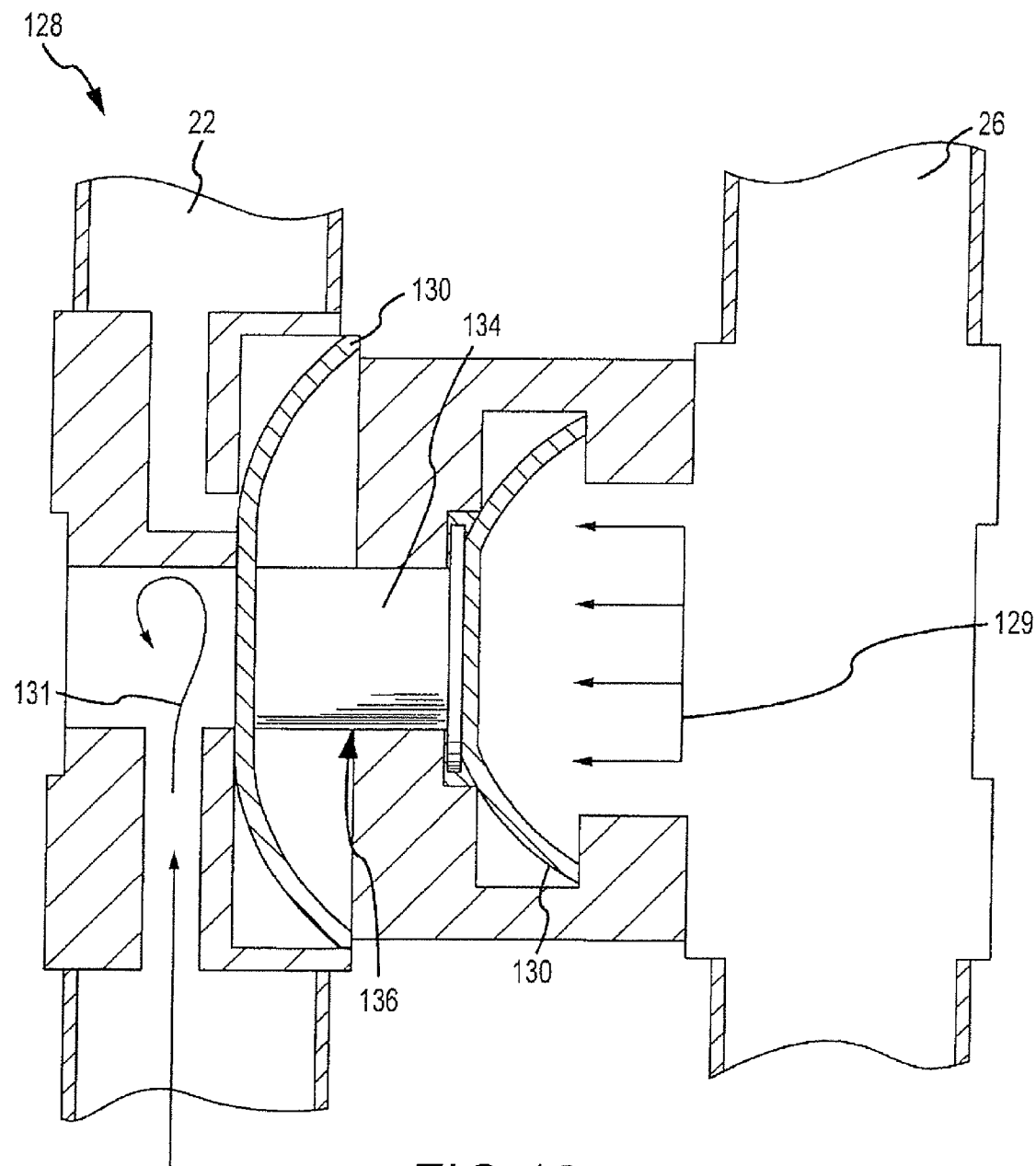
FIG. 13 shows a cross-section view of the hydraulic shut-off mechanism when the appliance is turned off.
Figure 14:
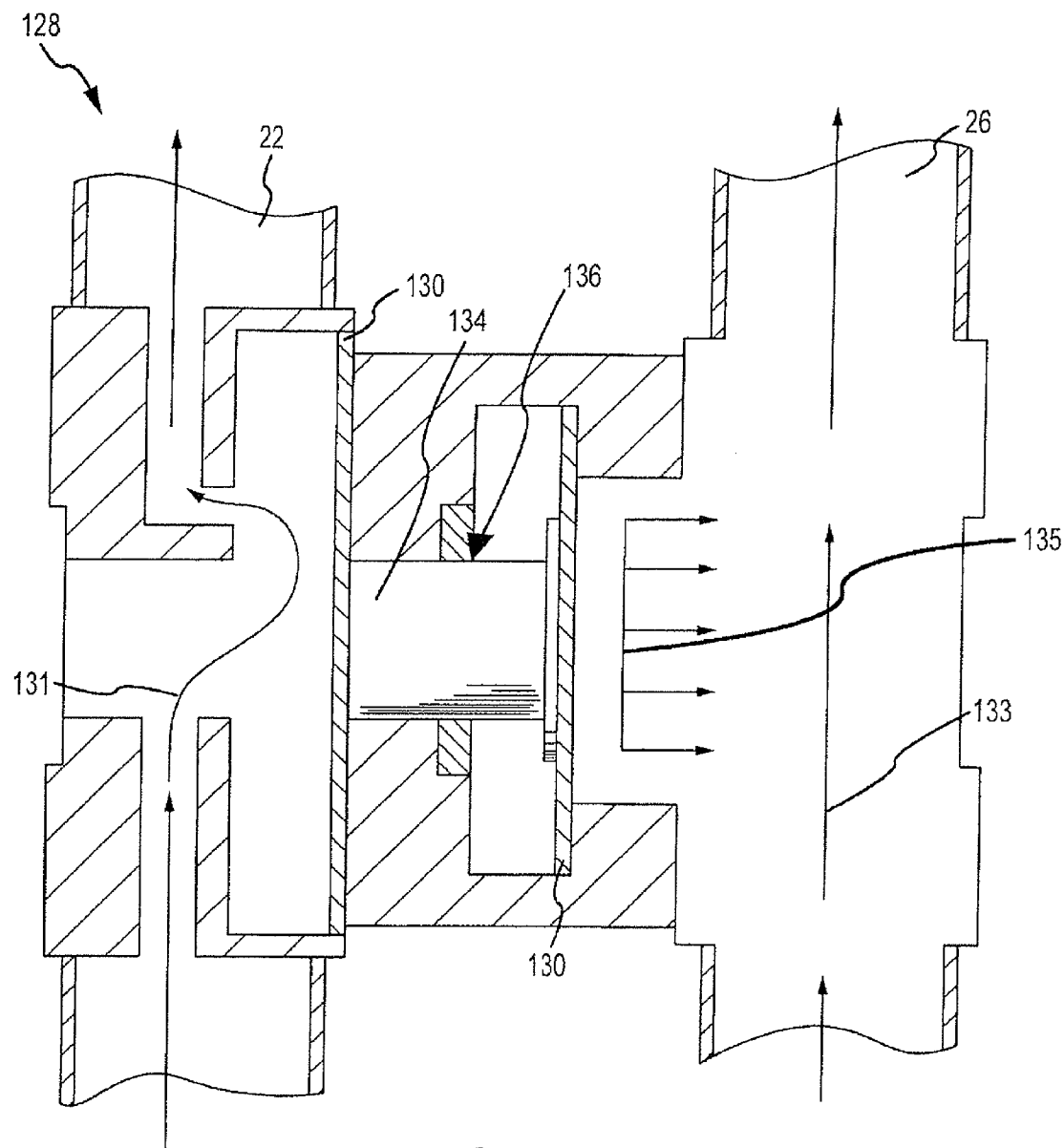
Figure 15:
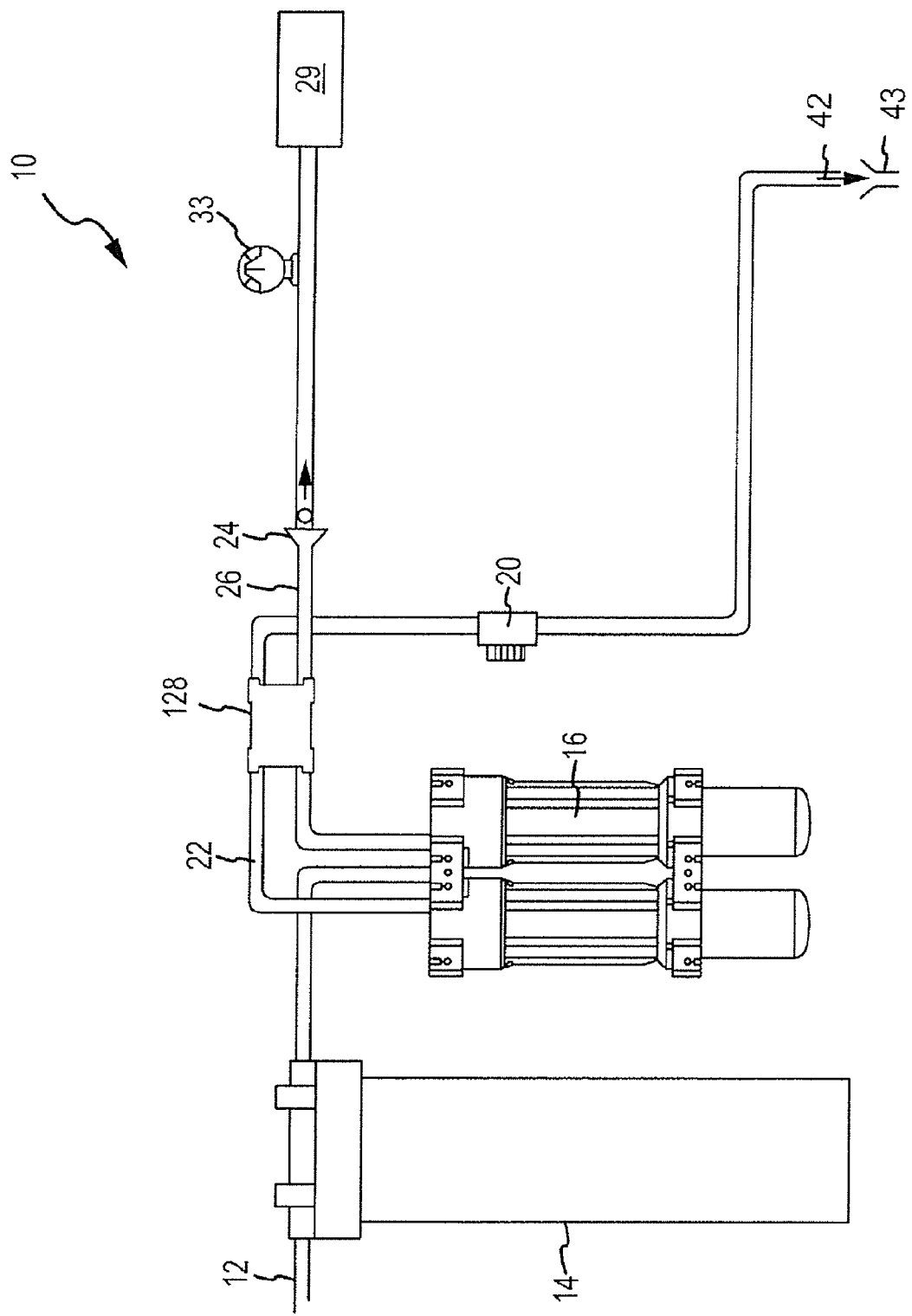
FIG. 15 shows a schematic representation of a reverse osmosis system and hydraulic shut-off mechanism connected to an appliance according to one embodiment of the invention.

Now referring primarily to FIG. 13, the operation of hydraulic shut-off mechanism 128 will be described when concentrate flow 131 is restricted due to internal pressure changes. In one embodiment in which RO system 10 is connected directly to appliance 29, back pressure 129 may increase through a decrease in purified water flow 133 velocity by deactivating appliance 29. Decreasing the purified water flow 133 velocity in product line 26 increases the internal pressure, i.e. back pressure 129, which applies a force against gasket 130 as well as slide valve 134. In turn, a seal is formed in drain line 22 thereby restricting concentrate flow 131.

Hydraulic shut-off mechanism 128 will now be described when concentrate flow 131 is unrestricted (FIG. 14) due to internal pressure changes. In one embodiment in which RO system 10 is connected directly to appliance 29, vacuum 135 may be increased through an increase in purified water flow 133 velocity by activating appliance 29. Increasing the purified water flow 133 velocity in product line 26 decreases the internal pressure and creates vacuum 135 which pulls gasket 130 as well as slide valve 134 away from drain line 22. In turn, the seal is broken in drain line 22 and concentrate flow 131 is unrestricted. As can be seen by, comparing FIG. 13 and FIG. 14, gaskets 130 are flexibly responsive to pressure changes in the drain line 22 and product line 26 and drain line 22 and product line 26 are substantially parallel with flow in the same direction. Slide valve 134 is bounded at each of its opposed ends by a respective gasket 130.

Efficiency and performance of hydraulic shut-off mechanism 128 are similar to that of shut-off mechanism 28. For example, an efficiency ratio of purified water 40 to unpurified water 41 may be obtained in a range of about 33% and about 60%. Directly connecting semipermeable membrane 48 to appliance 29 and operatively associating hydraulic shut-off mechanism 128 with drain line 22 and product line 26 also allows the RO system 10 to promptly react to pressure changes without the use of electric components, thereby further increasing efficiency and reducing waste. Additionally, hydraulic shut-off mechanism 128 in conjunction with semipermeable membrane 48 may create more efficient production of purified water 40, maintaining flow rates between about 0.9 to about 15.1 liters/minute (about 0.25 to about 4.0 gallons/minute) without use of a storage tank or a booster pump. Like shut-off mechanism 28, hydraulic shut-off mechanism 128 may also be used with inlet pressures ranging between about 207 kPa and about 690 kPa (about 30 psi and about 100 psi), without a booster pump, depending on the temperature and presence of TDS in unpurified water 41. Accordingly, method 100 may also be used in connection with hydraulic shut-off mechanism 128.

Having thoroughly described RO system 10 and method 100 according to the present invention, it should be noted that the foregoing description has been presented for purposes of illustration and description of the present invention. It is not intended to be exhaustive or to limit the invention to the precise embodiments disclosed. For example, embodiments shown and described herein use a spiral wound RO semipermeable membrane 48 in combination with an automatic shut-off mechanism 28 comprising a pressure switch 30, pressure sensor 31, and solenoid valve 32, or hydraulic shut-off mechanism 128. Other combinations of semipermeable membranes and various combinations of shut-off mechanisms comprising different types of pressure switches, pressure sensors, solenoid valves, and hydraulic shut-off mechanisms may be used for this purpose. Consequently, the present invention should not be limited to particular RO semipermeable membrane 48, shut-off mechanism 28 and hydraulic shut-off mechanism 128 components described herein. Having herein set forth various embodiments of the present invention, it is anticipated that modifications and variations will naturally occur to those of skill in the art after becoming familiar with the present invention. It is anticipated that such suitable modifications will nonetheless remain within the scope of the invention. The invention shall therefore be construed in accordance with the following claims.

What is claimed is:

1. Apparatus for purifying water, comprising:
    a reverse osmosis cartridge including a semipermeable membrane for providing purified water and a concentrate;
    a reverse osmosis module for housing the reverse osmosis cartridge, the reverse osmosis module including a feed line, a drain line, and a product line;
    a prefilter, the prefilter being connected to the feed line;
    a hydraulic shut-off mechanism, the hydraulic shut-off mechanism in direct fluid communication with the reverse osmosis module and directly and operatively coupled to the drain line and the product line, and containing a slide valve and two gaskets adjacent to the slide valve; and
    an appliance, the appliance being connected to the product line, operatively associated with the gasket, and in direct fluid communication with one of the gaskets,
    whereby activation of the appliance causes purified water to flow at the appliance and initiates a pressure drop across the hydraulic shut-off mechanism, the pressure drop causing movement of the gaskets thereby causing production of the purified water without a booster pump, a storage tank, or electricity and wherein at least one of the gaskets is configured to start or stop the production of concentrate.

2. The apparatus of claim 1, wherein the semipermeable membrane is spiral wound around a perforated tube.

3. The apparatus of claim 2, wherein the semipermeable membrane is layered between spacers and spiral wound around the perforated tube.

4. The apparatus of claim 1, wherein the reverse osmosis cartridge is interchangeable.

5. The apparatus of claim 1, wherein the hydraulic shut-off mechanism comprises the slide valve bounded at each of opposed ends by a respective one of the gaskets.

6. The apparatus of claim 5, wherein one of the respective gaskets directly contacts flow in the drain line and the other of the gaskets directly contacts flow in the product line and the gaskets are flexibly responsive to pressure changes in the respective one of the drain and product lines.

7. The apparatus of claim 6, wherein, within the hydraulic shut-off mechanism, the drain line and the product line are substantially parallel and fluid flows through the drain line and the product line in the same direction.

8. The apparatus of claim 1, further comprising a check valve connected to the drain line, the check valve being configured to limit flow direction of the concentrate towards a drain.

9. The apparatus of claim 1, further comprising a check valve connected to the product line, the check valve being configured to limit flow direction of the purified water towards the appliance.

10. The apparatus of claim 1, wherein the feed line is connected to a municipal water source.

11. The apparatus of claim 1, further comprising a flow controller connected to the drain line and disposed between the reverse osmosis module and the hydraulic shut-off mechanism.

12. A water purification system, comprising:
a feed line, the feed line being coupled to a municipal water source;
a prefilter, the prefilter being connected to the feed line;
a reverse osmosis cartridge for providing purified water and a concentrate;
a reverse osmosis module for housing the reverse osmosis cartridge, the reverse osmosis module being connected to the prefilter, a drain line, and a product line;
a hydraulic shut-off mechanism, the hydraulic shut-off mechanism containing a slide valve and two gaskets, and being operatively coupled to the reverse osmosis cartridge and configured to cause and maintain the production of purified water;
at least one check valve, the check valve being configured to limit flow direction of the purified water or the concentrate;
a flow controller; and
an appliance, the appliance being connected to the product line, operatively associated with the flow controller, and in direct fluid communication with the hydraulic shut-off mechanism,
whereby activation of the appliance causes purified water to flow at the appliance and initiates a pressure drop across the hydraulic shut-off mechanism, the pressure drop causing movement of the gaskets thereby causing production of the purified water without a booster pump, a storage tank, or electricity and wherein the appliance is connected to the product line and is configured to initiate concentrate flow in the drain line and purified water flow in the product line.

13. The water purification system of claim 12, wherein the reverse osmosis cartridge comprises a semipermeable membrane.

14. The water purification system of claim 13, wherein the semipermeable membrane is layered between spacers and spiral wound around a perforated tube.

15. The water purification system of claim 12, wherein the hydraulic shut-off mechanism comprises the slide valve bounded at each of opposed ends by a respective of the gaskets.

16. The water purification system of claim 15, wherein one of the gaskets directly contacts flow in the drain line and the other of the gaskets directly contacts flow in the product line and the gaskets are flexibly responsive to pressure changes in the respective one of the drain and product line caused by activation of the appliance.

17. The water purification system of claim 12, wherein the flow controller is connected to the drain line and disposed between the reverse osmosis module and the hydraulic shut-off mechanism.

18. Apparatus for purifying water, comprising:
a reverse osmosis spiral wound semipermeable membrane, the reverse osmosis spiral wound semipermeable membrane including a perforated tube for producing purified water;
a hydraulic shut-off mechanism, the hydraulic shut-off mechanism including a slide valve and two gaskets and operatively associated with an appliance, the hydraulic shut-off mechanism being configured to restrict concentrate flow and directly coupled to the appliance,
a feed line, the feed line being connected to the reverse osmosis spiral wound semipermeable membrane;
a product line, the product line being coupled to the perforated tube; and
the appliance directly coupled to the product line,
wherein the hydraulic shut-off mechanism and reverse osmosis spiral wound semipermeable membrane are configured to create and maintain the production of purified water without a storage tank or a booster pump and wherein activation of the appliance causes a) movement of the slide valve, b) purification of water in the apparatus and c) water flow in the product line, without electricity.

19. The apparatus of claim 18, wherein the appliance is configured to initiate concentrate flow in a drain line that is operatively associated with the slide valve.

20. The apparatus of claim 18, further comprising an interchangeable reverse osmosis cartridge, the reverse osmosis cartridge containing the reverse osmosis spiral wound semipermeable membrane.

21. The apparatus of claim 18, wherein the feed line is connected to a municipal water source and a prefilter.

22. The apparatus of claim 18, further comprising a flow controller, the controller being operatively associated with the appliance.

23. The apparatus of claim 18, wherein the hydraulic shut-off mechanism comprises the slide valve bounded at each of opposed ends by a respective one of the gaskets and wherein one of the respective gaskets directly contacts flow in the product line and the other of the gaskets directly contacts flow in a drain line and the gaskets are flexibly responsive to pressure changes in the respective one of the drain and product lines.

24. A method for purifying water, comprising:
activating an appliance by turning on a valve thereby causing purified water to flow at the appliance and initiating a pressure drop across a reverse osmosis system without using any electrical components by causing a slide valve with gaskets at opposed ends to slide thereby causing flow through the reverse osmosis system and causing water purification by the reverse osmosis system without a pump or storage tank, wherein the appliance is connected to the valve and to a product line; and supplying purified water to the appliance without a pump or storage tank in sufficient amounts to allow the appliance to operate substantially without interruption, wherein the purified water is supplied to the appliance in the product line, one of the gaskets directly contacts flow in a drain line and the other of the gaskets directly contacts flow in the product line, the gaskets are flexibly responsive to pressure changes in the reverse osmosis system.

25. The method of claim 24, wherein the sufficient amounts of purified water are in a range of about 33% to about 60% of water entering the reverse osmosis system.

26. The method of claim 24, further comprising maintaining a system pressure across the reverse osmosis system in a range of about 207 kPa and about 690 kPa (about 30 psi to about 100 psi).

27. The method of claim 26, wherein the range is between about 345 kPa and about 690 kPa (about 50 psi to about 100 psi).

28. The method of claim 24, wherein the flow through the reverse osmosis system comprises flow through a perforated tube and through a semipermeable membrane that is spiral wound around the perforated tube.

* * * * *